(12) United States Patent
Mobin et al.

(10) Patent No.: US 7,720,142 B2
(45) Date of Patent: May 18, 2010

(54) METHOD AND APPARATUS FOR DECISION-FEEDBACK EQUALIZATION USING SINGLE-SIDED EYE WITH GLOBAL MINIMUM CONVERGENCE

(75) Inventors: Mohammed S. Mobin, Orefield, PA (US); Gregory W Sheets, Breinigsville, PA (US); Lane A. Smith, Easton, PA (US); Paul H. Tracy, Schnecksville, PA (US)

(73) Assignee: Agere Systems Inc., Allentown, PA (US)

( * ) Notice: Subject to any disclaimer, the term of this patent is extended or adjusted under 35 U.S.C. 154(b) by 676 days.

(21) Appl. No.: 11/686,148

(22) Filed: Mar. 14, 2007

(65) Prior Publication Data
US 2008/0080611 A1   Apr. 3, 2008

Related U.S. Application Data

(63) Continuation-in-part of application No. 11/540,946, filed on Sep. 29, 2006.

(51) Int. Cl.
*H03H 7/30*       (2006.01)
*H03H 7/40*       (2006.01)
*H03K 5/159*      (2006.01)

(52) U.S. Cl. .................... 375/233; 375/229; 375/230; 375/232

(58) Field of Classification Search .......... 375/229–236
See application file for complete search history.

(56) References Cited

U.S. PATENT DOCUMENTS

| 7,590,175 B2 * | 9/2009 | Leibowitz et al. ........... 375/229 |
| 2002/0085656 A1 | 7/2002 | Lee et al. | |

* cited by examiner

*Primary Examiner*—Curtis B Odom
(74) *Attorney, Agent, or Firm*—Ryan, Mason & Lewis, LLP

(57) ABSTRACT

Methods and apparatus are provided for decision-feedback equalization with global minimum convergence. A threshold position of one or more DFE latches employed by a decision-feedback equalizer is determined by obtaining a plurality of samples of a single-sided data eye using at least one decision latch and at least one roaming latch; comparing the samples obtained by the at least one decision latch and at least one roaming latch to identify an upper and lower voltage boundary of the single-sided data eye; and determining a threshold position of the one or more DFE latches based on the upper and lower voltage boundaries. The comparison can optionally comprise obtaining an exclusive or (XOR) of the samples obtained by the at least one decision latch and at least one roaming latch. The XOR comparison positions an opening for the single-sided data eye at a zero hit count.

24 Claims, 7 Drawing Sheets

FIG. 9

900 — Vertical Eye Search Algorithm

910 — Align Roaming and Decision Latches in time with center of eye

920 —
Constrain data for Upper DFE data eye (1 → x)
Measure the data eye opening:
  Place latch $L2_U$ at a minimum threshold setting ($V_{th}=0$)
    Increment Threshold and Measure Count until reach mid-point ($V_{th}=N$)
  Place latch $L1_U$ at a minimum threshold setting ($V_{th}=N$)
    Increment Threshold and Measure Count until reach mid-point ($V_{th}=2N$)

930 —
Constrain data for Lower DFE data eye (0 → x)
Measure the data eye opening:
  Place latch $L2_L$ at a minimum threshold setting ($V_{th}=0$)
    Increment Threshold and Measure Count until reach mid-point ($V_{th}=N$)
  Place latch $L1_L$ at a minimum threshold setting ($V_{th}=N$)
    Increment Threshold and Measure Count until reach mid-point ($V_{th}=2N$)

940 —
Analyze hit count data in histogram to identify data eye openings 810, 820 at zero hit counts for upper and lower DFE data eyes
Identify minimum and maximum thresholds at zero hit count associated with each data eye opening 810, 820
Establish latch position for upper and lower DFE data eyes as middle of data eye opening 810, 820

METHOD AND APPARATUS FOR DECISION-FEEDBACK EQUALIZATION USING SINGLE-SIDED EYE WITH GLOBAL MINIMUM CONVERGENCE

CROSS-REFERENCE TO RELATED APPLICATIONS

The present application is a continuation-in-part application of U.S. patent application Ser. No. 11/540,946, filed Sep. 29, 2006, entitled "Method and Apparatus for Determining Latch Position for Decision-Feedback Equalization Using Single-Sided Eye," and is related to U.S. patent application Ser. No. 11/414,522, filed Apr. 28, 2006, entitled "Method and Apparatus for Determining a Position of a Latch Employed for to Decision-Feedback Equalization," and U.S. patent application Ser. No. 11/541,379, filed Sep. 29, 2006, entitled "Method and Apparatus for Non-Lineal Decision-Feedback Equalization in the Presence Of Asymmetric Channel," each incorporated by reference herein.

FIELD OF THE INVENTION

The present invention relates generally to decision-feedback equalization techniques, and more particularly, to techniques for determining the position of one or more latches employed for decision-feedback equalization.

BACKGROUND OF THE INVENTION

Digital communication receivers must sample an analog waveform and then reliably detect the sampled data. Signals arriving at a receiver are typically corrupted by intersymbol interference (ISI), crosstalk, echo, and other noise. In order to compensate for such channel distortions, communication receivers often employ well-known equalization techniques. For example, zero equalization or decision-feedback equalization (DFE) techniques (or both) are often employed. Such equalization techniques are widely-used for removing intersymbol interference and to improve the noise margin. See, for example, R. Gitlin et al., Digital Communication Principles, (Plenum Press, 1992) and E. A. Lee and D. G. Messerschmitt, Digital Communications, (Kluwer Academic Press, 1988), each incorporated by reference herein. Generally, zero equalization techniques equalize the pre-cursors of the channel impulse response and decision-feedback equalization equalizes the post cursors of the channel impulse response.

In one typical DFE implementation, a received signal is sampled and compared to one or more thresholds to generate the detected data. A DFE correction is applied in a feedback fashion to produce a DFE corrected signal. The addition/subtraction, however, is considered to be a computationally expensive operation. Thus, a variation of the classical DFE technique, often referred to as Spatial DEE, eliminates the analog adder operation by sampling the received signal using two (or more) vertical slicers that are offset from the common mode voltage. The two slicers are positioned based on the results of a well-known Least Mean Square (LMS) algorithm. One slicer is used for transitions from a binary value of 0 and the second slicer is used for transitions from a binary value of 1. The value of the previous detected bit is used to determine which slicer to use for detection of the current bit. For a more detailed discussion of Spatial DFE techniques, see, for example, Yang and Wu, "High-Performance Adaptive Decision Feedback Equalizer Based on Predictive Parallel Branch Slicer Scheme," IEEE Signal Processing Systems 2002, 121-26 (2002), incorporated by reference herein.

A communication channel typically exhibits a low pass effect on a transmitted signal. Conventional channel compensation techniques attempt to open the received data eye that has been band limited by the low pass channel response. Thus, the various frequency content of the signal will suffer different attenuation at the output of the channel. Generally, the higher frequency components of a transmitted signal are impaired more than the lower frequency components.

In many DFE applications, the Least Mean Square algorithm positions the vertical slicers by evaluating an error term for a known receive data stream. Such known receive data streams, however, are not always available. In addition, such techniques often converge to a local minimum, producing sub-optimal results. In some cases, such techniques can converge to he wrong adapted latch position values. A need exists for improved methods and apparatus for decision-feedback equalization with global minimum convergence. A further need exists for methods and apparatus that position one or more DFE latches using global minimum convergence and an evaluation of the incoming data eye.

SUMMARY OF THE INVENTION

Generally, methods and apparatus are provided for decision-feedback equalization with global minimum convergence. According to one aspect of the invention, a threshold position of one or more DFE latches employed by a decision-feedback equalizer is determined by obtaining a plurality of samples of a single-sided data eye using at least one decision latch and at least one roaming latch; comparing the samples obtained by the at least one decision latch and at least one roaming latch to identify an upper and lower voltage boundary of the single-sided data eye; and determining a threshold position of the one or more DFE latches based on the upper and lower voltage boundaries. The comparison can optionally comprise obtaining an exclusive or (XOR) of the samples obtained by the at least one decision latch and at least one roaming latch. The XOR comparison positions an opening for the single-sided data eye at a zero hit count.

The at least one decision latch is adaptively positioned approximately in a center of a single-sided data eye. In one implementation, a first decision latch is adaptively positioned approximately in a center of an upper single-sided data eye and a second decision latch is adaptively positioned approximately in a center of a lower single-sided data eye. The at least one roaming latch samples the single-sided data eye for a plurality of voltage settings. For example, at least two of the roaming latches can sample a portion of the single-sided data eye for a plurality of voltage settings.

A more complete understanding of the present invention, as well as further features and advantages of the present invention, will be obtained by reference to the following detailed description and drawings.

BRIEF DESCRIPTION OF THE DRAWINGS

FIG. 9 provides exemplary pseudo code for an illustrative vertical eye search algorithm incorporating features of the present invention.

DETAILED DESCRIPTION

The present invention provides methods and apparatus for determining the position of DFE latches using a global minimum. According to one aspect of the invention, the position for the vertical latches of a DFE is determined based on an evaluation of the incoming data eye. The exemplary data eye monitor may be implemented, for example, using the techniques described in U.S. patent application Ser. No. 11/095,178, filed Mar. 31, 2005, entitled "Method and Apparatus for Monitoring a Data Eye in a Clock and Data Recovery System," incorporated by reference herein.

Single-Sided DFE Placement Techniques

U.S. patent application Ser. No. 11/540,946, filed Sep. 29, 2006, entitled "Method and Apparatus for Determining Latch Position for Decision-Feedback Equalization Using Single-Sided Eye," discloses techniques, incorporated herein by reference and referred to herein as "Single-Sided DFE Placement Techniques" The disclosed Single-Sided DFE Placement Techniques position the vertical slicers using a single sided eye. As used herein, a single-sided eye (also referred to as a DFE eye) contains only transitions from one binary value (i.e., only 1→x or 0→x transitions). The small data eye is the result of the channel distortions that tend to close the data eye. The Single-Sided DFE Placement Techniques recognize that a larger DFE eye can be extracted by constraining the data to only contain signal transitions from, for example, a binary value 1 to a binary value of 0 or 1 (referred to as 1→x), and inhibiting any signal transitions from a binary value of 0.

As discussed further below in conjunction with FIG. 2, when the data is constrained to only have 1→x transitions, a significant amount of distortion that would normally be associated with the 0→x transitions is removed and the resulting upper DFE eye is larger than the small data eye associated with a classical approach. Likewise, when the data is constrained to only have 0→x transitions, a significant amount of distortion that would normally be associated with the 1→x transitions is removed and the resulting lower DFE eye is larger than the small data eye associated with a classical approach. In this manner, by inhibiting one set of binary transitions, the size of the data eye is significantly increased, and the noise margin is improved.

Figure 1:
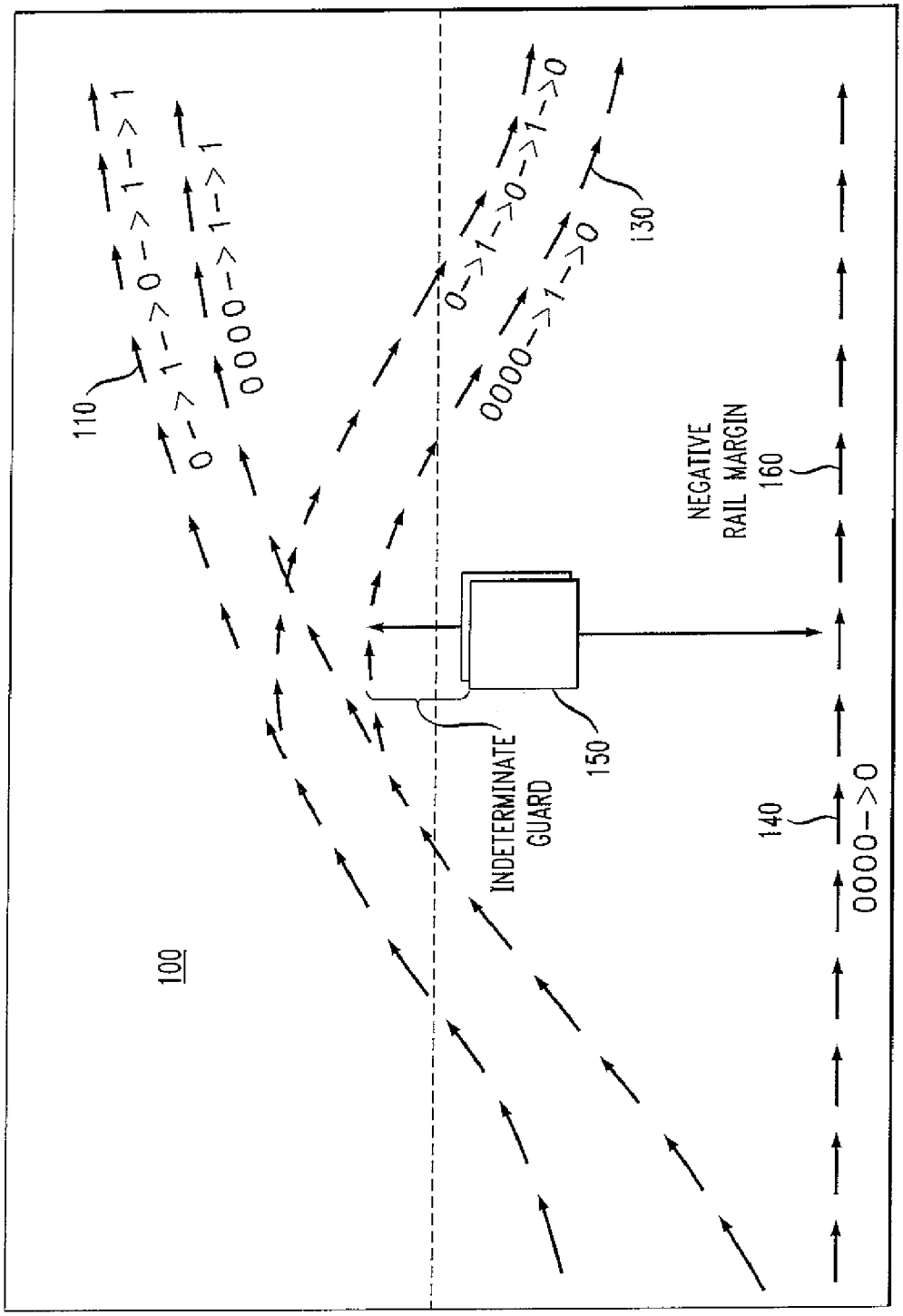
FIG. 1 illustrates an exemplary transition trajectory from an exemplary binary value of 0 to a binary value of 0 or 1.

FIG. 1 illustrates an exemplary transition trajectory for an exemplary transition from a binary value of 0 for a first data eye to a binary value of 0 or (0→x) for the current data bit. A trajectory 110, for example, is associated with a transition from a binary value of 0 to a 1 (and then followed by another 1 for the next data bit). A trajectory 130, for example, is associated with a transition from a binary value of 0 having prior states 000 to a binary value of 1 (followed by a 0). A trajectory 140 is associated with a transition from a binary value of 0 having prior states 000 to a binary value of 0.

As shown in FIG. 1, the different trajectories are all associated with a prior state of 0. Each trajectory, however, follows a different path. In accordance with a Spatial DFE technique, one or more latches 150 can detect whether the current data bit is a 0 or a 1, despite the varying paths. Generally, the latch 150 is positioned between the negative rail margin 160 and the amplitude of the lowest expected trajectory 130. A data eye monitor can be used to determine a location for the latch 150 used for the spatial DFE.

A communication channel typically exhibits a low pass effect on a transmitted signal, causing the opening size of the received data eye to be significantly impaired, with the received data eye often being essentially closed. FIG. 2 illustrates the noise and timing margins for a received signal 200. As shown in FIG. 2, a received signal will typically include transitions 210 from a binary value 1 to a binary value of 0 or 1 (1→x), as well as transitions 220 from a binary value 0 to a binary value of 0 or 1 (0→x).

The Single-Sided DFE Placement Techniques recognize that a larger DFE eye can be extracted by constraining the data to only contain signal transitions from, for example, a binary value 1 to a binary value of 0 or 1 (referred to as 1→x), and inhibiting any signal transitions from a binary value of 0 (or vice versa).

Figure 2:
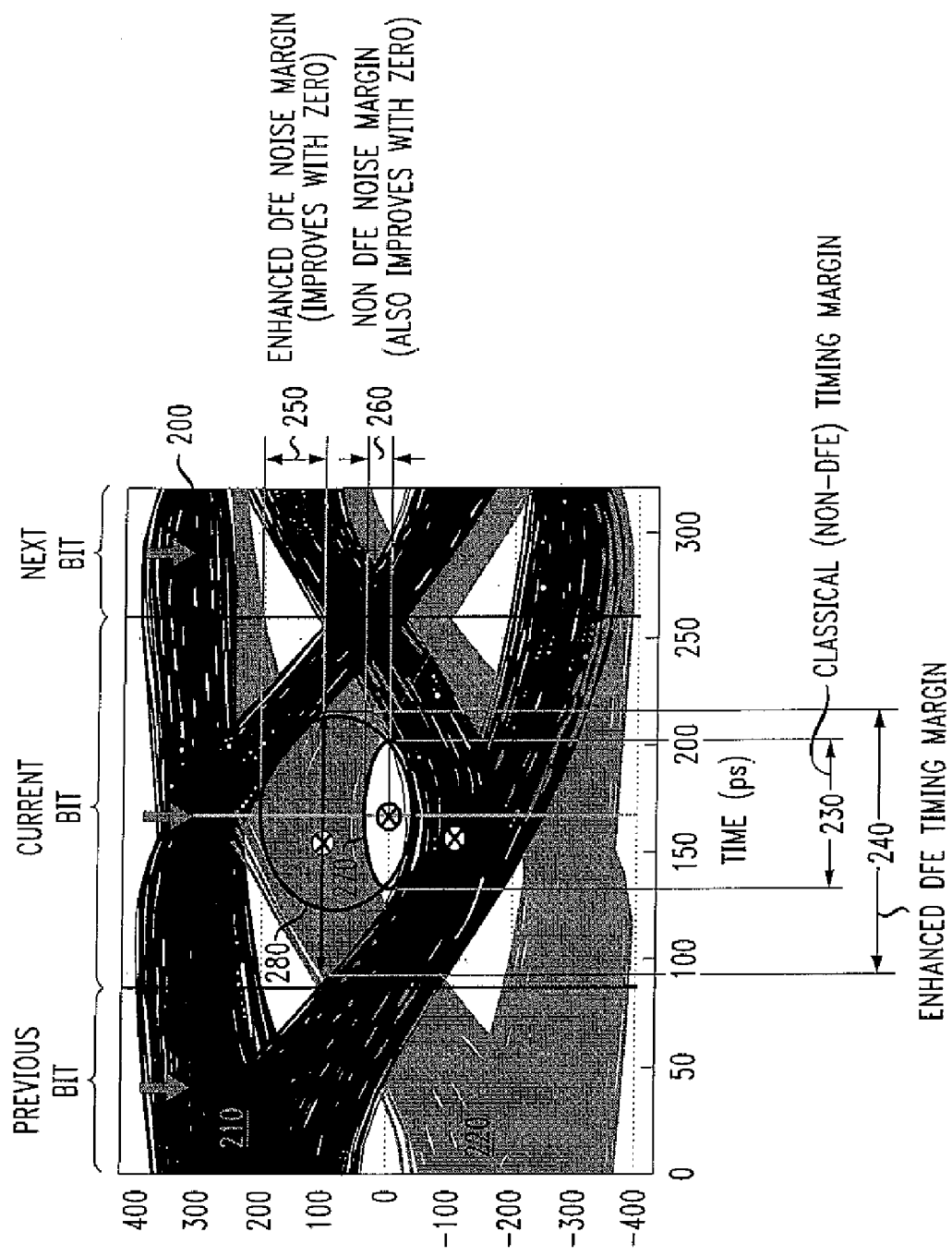
FIG. 2 illustrates the noise and timing margins for a received signal.

As shown in FIG. 2, when the full set of signal transitions is considered, the size of the classical data eye is approximately associated with the inner circle 270, having an associated timing margin 230 and noise margin 260. The small size of the data eye 270 with the corresponding poor margins 230, 260, makes it very difficult to properly recover the transmitted data. When the data is constrained to only have 1→x transitions, the distortion that would normally be associated with the 0→x transitions is removed and the resulting upper DFE eye, approximately associated with the outer circle 280, is larger than the small data eye 270 associated with a classical approach (and both sets of transitions). The upper DFE eye 280 has an associated timing margin 240 and noise margin 250. Thus, by inhibiting one set of binary transitions 210, 220, the size of the data eye 280 is significantly increased, and the timing and noise margins 240, 250 are improved.

Likewise, when the data is constrained to only have 0→x transitions, a significant amount of distortion that would normally be associated with the 1→x transitions is removed and the resulting lower DFE eye is larger than the small data eye associated with a classical approach. In this manner, by inhibiting one set of binary transitions, the size of the data eye is significantly increased, and the noise and timing margins are improved.

Figure 3:
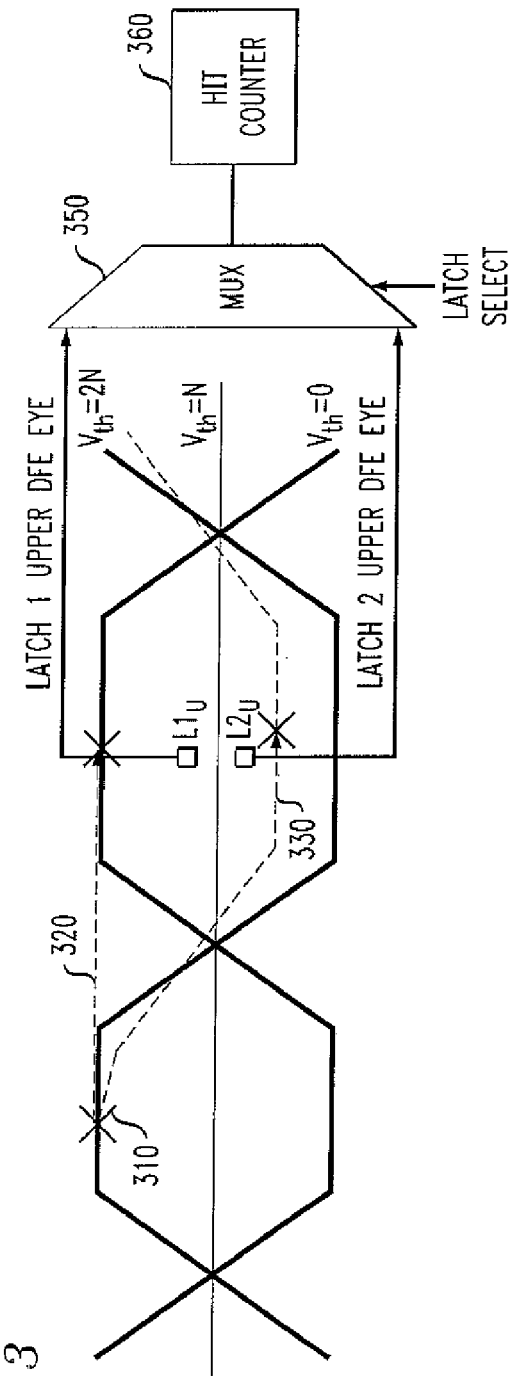
FIG. 3 illustrates the sampling of a signal using a data eye monitor for a transition from a binary value of 1 to a binary value of 0 or 1.

FIG. 3 illustrates the sampling of a signal using a data eye monitor for a transition 330 from an initial state 310 of binary value 1 to a binary value of 0 or a transition 320 from a binary value of 1 to a binary value of 1. For ease of illustration, only the trajectory 330 associated with the Nyquist frequency and the trajectory 320 associated with the maximum amplitude of the remaining (non-Nyquist) frequencies are shown. As shown in FIG. 3, two upper latches $L1_U$ and $L2_U$ are employed in the exemplary embodiment to determine the amplitudes of the trajectories 320, 330 for the upper DFE data eye and thereby determine a location for the latch(es) used for the spatial DFE 340.

As shown in FIG. 3, the exemplary first upper roaming latch $L1_U$ samples the received signal from the point of zero crossing ($V_{th}$=N) in the positive direction to the maximum value ($V_{th}=2N$). Likewise, the second upper roaming latch $L2_U$ samples the received signal from the point of zero crossing ($V_{th}=N$) in the negative direction to the minimum value ($V_{th}=0$). The sampled values (Latch 1 Upper DFE Eye and Latch 2 Upper DFE Eye) are applied to a multiplexer 350 that selects one of the latches, based on the portion of the data eye that is being sampled in accordance with a latch selection control signal. The output of the multiplexer 350 is applied to a hit counter 360, discussed further below in conjunction with FIG. 5.

Figure 4:
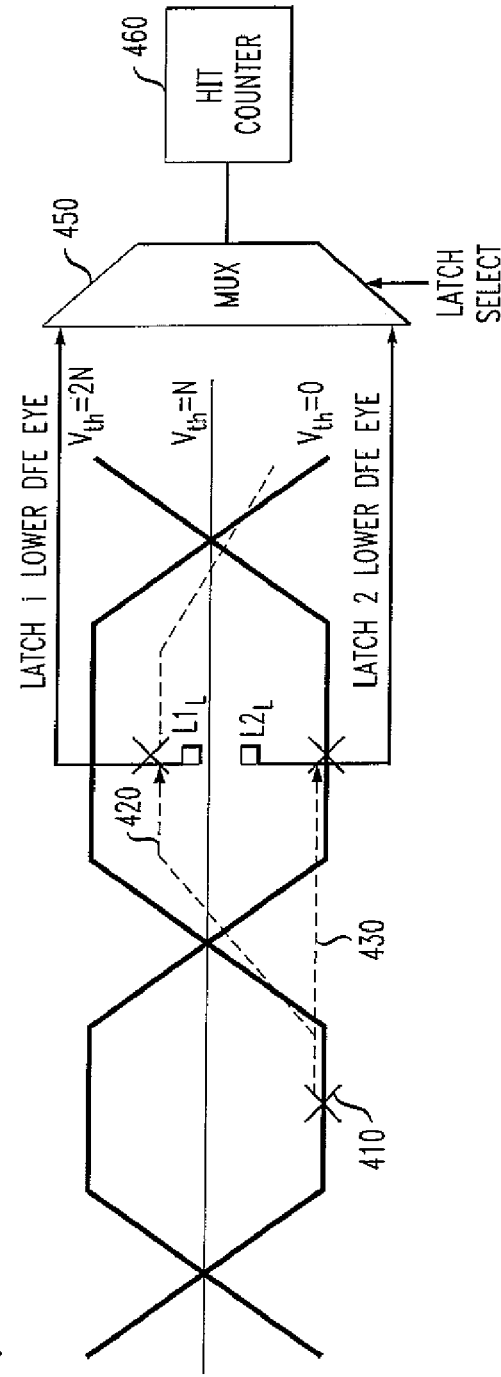
FIG. 4 illustrates the sampling of a signal using a data eye monitor for a transition from a binary value of 0 to a binary value of 0 or 1.

FIG. 4 illustrates the sampling of a signal using a data eye monitor in accordance with the Single-Sided DFE Placement Techniques for a transition 430 from an initial state 410 of binary value 0 to a binary value of 0 or a transition 420 from a binary value of 0 to a binary value of 1 and then a binary value of 0. For ease of illustration, only the trajectory 420 associated with the Nyquist frequency and the trajectory 430 associated with the minimum amplitude of the remaining (non-Nyquist) frequencies are shown. As shown in FIG. 4, two lower latches $L1_L$ and $L2_L$ are employed in the exemplary embodiment to determine the amplitudes of the trajectories 420, 430 for the lower DFE data eye and thereby determine a location for the latch(es) used for the spatial DFE.

As shown in FIG. 4, the first lower roaming latch $L1_L$ samples the received signal from the point of zero crossing ($V_{th}=N$) in the positive direction to the maximum value ($V_{th}=2N$). Likewise, the second lower roaming latch $L2_L$ samples the received signal from the point of zero crossing ($V_{th}=N$) in the negative direction to the minimum value ($V_{th}=0$). The sampled values (Latch 1 Lower DFE Eye and Latch 2 Lower DFE Eye) are applied to a multiplexer 450 that selects one of the latches, based on the portion of the data eye that is being sampled in accordance with a latch selection control signal. The output of the multiplexer 450 is applied to a hit counter 460, discussed further below in conjunction with FIG. 5.

Figure 5:
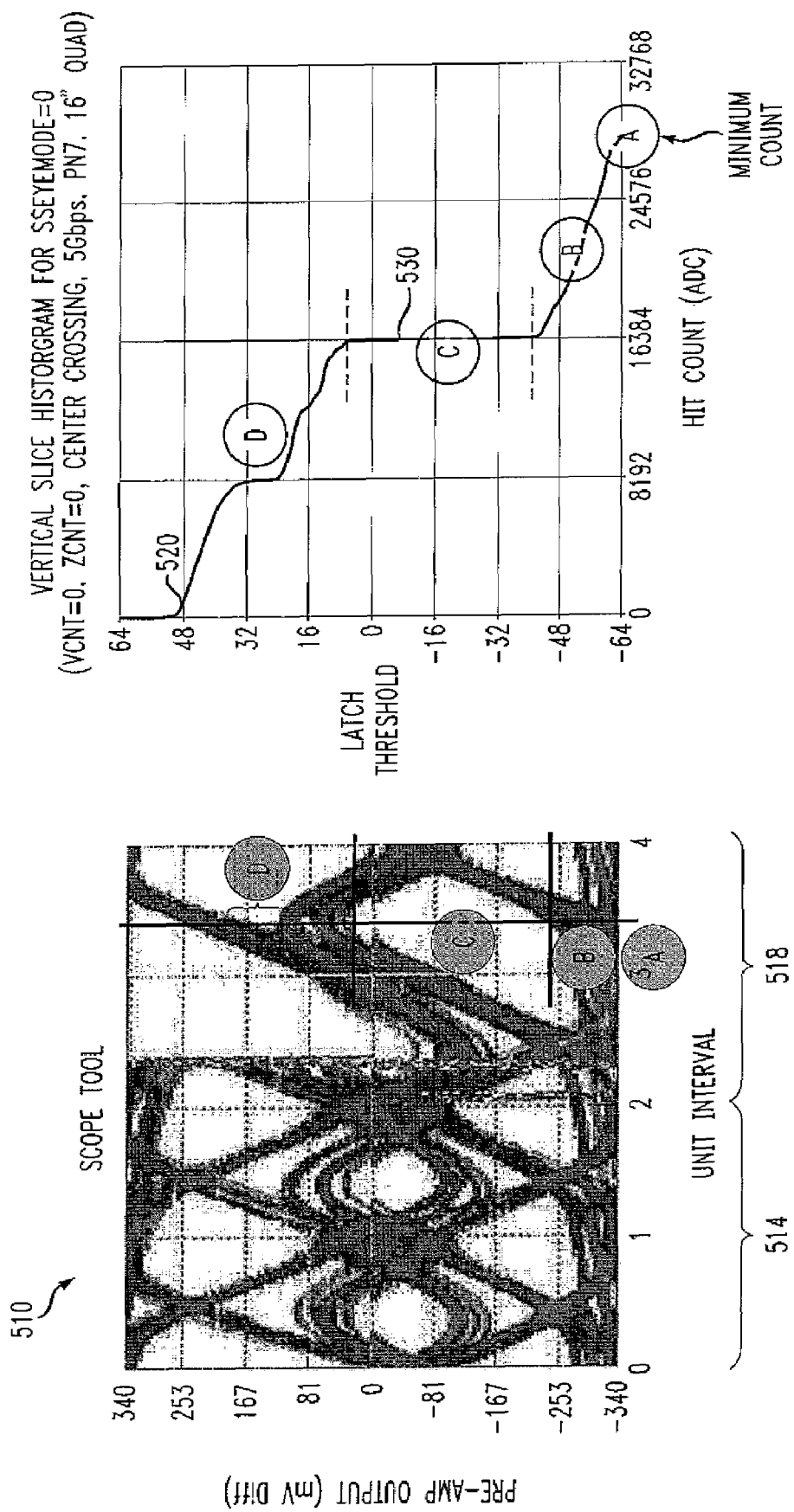
FIG. 5 illustrates a histogram indicating an eye opening for a single sided eye in accordance with the embodiment of FIG. 4.

FIG. 5 illustrates a histogram 520 generated by the hit counters 360, 460 of FIGS. 3 and 4, indicating an eye opening for a single sided eye in accordance with the Single-Sided DFE Placement Techniques. As shown in FIG. 5, a scope output 510 illustrates the preamplifier output as a function of the unit interval for four consecutive data eyes. For the first two data eyes 514, the output is shown for all transitions. For the second two eyes 518, only transitions from a binary value of 0 to a binary value of 0 or 1 ($0 \rightarrow x$) are shown, in accordance with the Single-Sided DFE Placement Techniques.

The histogram 520 shows the threshold of the roaming latches $L1_U$, $L2_U$, $L1_L$ and $L2_L$, as a function of the eye monitor counts generated by the hit counters 360, 460. As shown in FIG. 5, the minimum count occurs when the threshold is at a maximum value (since the entire signal is below the latch) and a maximum count occurs when the threshold is at a minimum value (since the entire signal is above the latch). The histogram 520 also contains one or more regions, such as region 530, having a constant count, corresponding to the DFE eye opening ($0 \rightarrow X$).

As shown in FIG. 5, legion A corresponds to the lowest observed roaming threshold, where the entire signal lies above the threshold. For region A, the data statistics generated by the hit counter 460 show a maximum density (hit count) of ones. As the roaming threshold is increased from the lowest setting, the hit count starts to decrease as the threshold traverses through the eye traces in region B. Next, as the roaming threshold traverses through the DFE eye (i.e., inside the DFE data eye), the hit count value remains constant, as shown in region C (also referred to as legion 530). Region C is the correct global convergence region.

The present invention recognizes that the true global minimum can be missed by the latch positioning algorithm (for example, in the presence of noise). Thus, a smaller local minimum, such as region D of FIG. 5, can be improperly identified as the minimum. For example, areas of inactivity in FIG. 5 can appear as a local minimum. The present invention thus provides techniques for determining the position of DFE latches using a global minimum. A vertical eye search algorithm, discussed below in conjunction with FIG. 9, determines when the histogram is in the global minimum region, to obtain the range of threshold values when the eye is open and to thereafter determine the latch positions.

Figure 6:
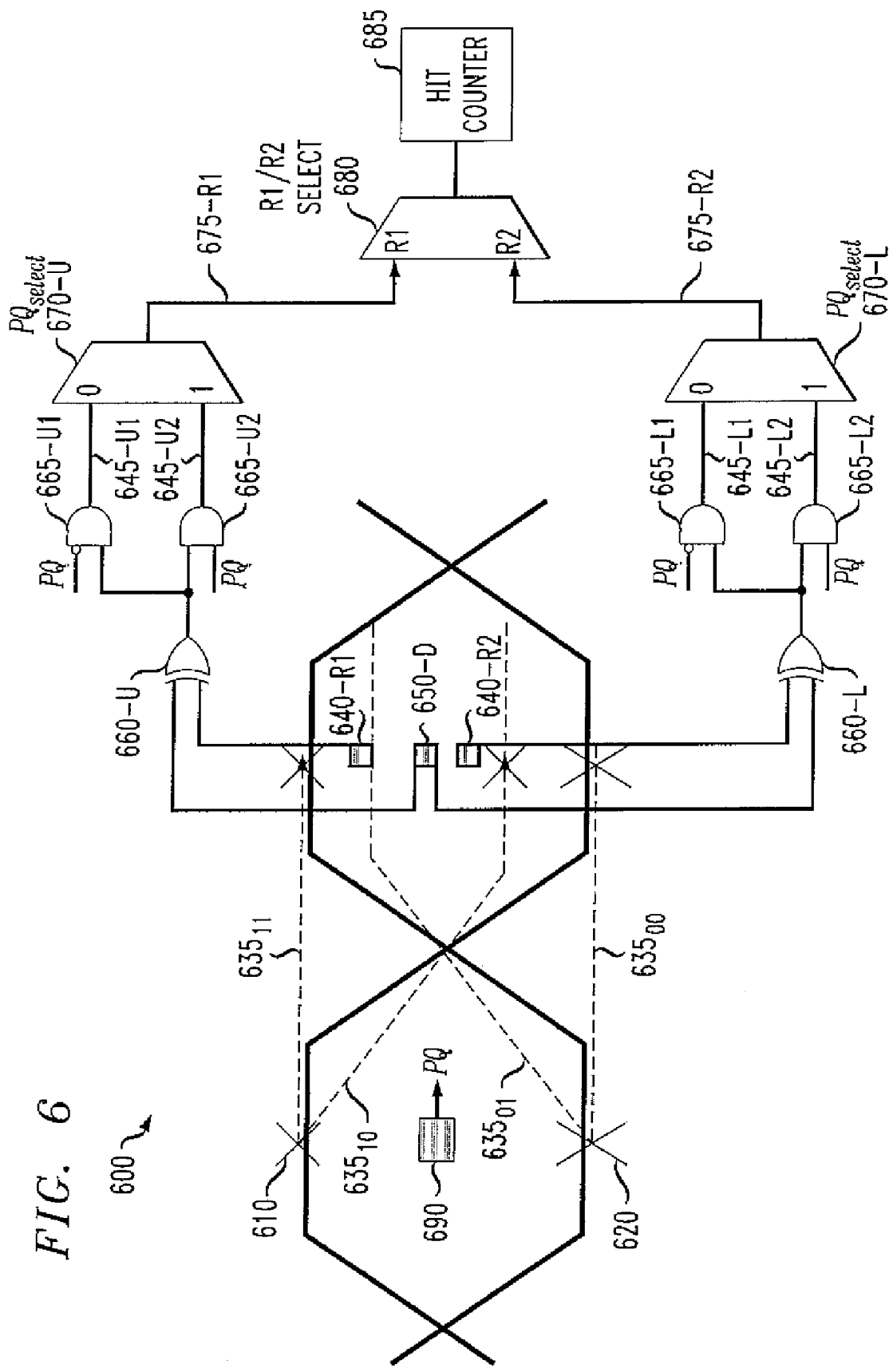
FIG. 6 illustrates the sampling of a signal using a data eye monitor in accordance with the present invention.

FIG. 6 illustrates the sampling of a signal using a data eye monitor 600 in accordance with the present invention for $1 \rightarrow x$ transitions from a prior state 610 and $0 \rightarrow x$ transitions from a prior state 620. For ease of illustration, only the trajectories associated with the Nyquist frequency and with the most significant amplitude of the remaining (non-Nyquist) frequencies are shown.

The $1 \rightarrow x$ transitions from a prior state 610 comprise a transition $635_{10}$ from a binary value 1 to a binary value of 0 and a transition $635_{11}$ from a binary value of 1 to a binary value of 1. The $0 \rightarrow x$ transitions from a prior state 620 comprise a transition $635_{00}$ from a binary value 0 to a binary value of 0 and a transition $635_{01}$ from a binary value of 0 to a binary value of 1. As discussed further below, the data eye monitor 600 includes a pre-qualifier latch 690 to determine if the prior state has a value of 0 or 1.

As shown in FIG. 6 and discussed further below, the exemplary data eye monitor 600 also includes two roaming latches 640-R1 and 640-R2, and one or more decision latches 650-D to determine the DFE data decision of the trajectories 635 for the current working eye and thereby determine a location for the DFE latches used for the spatial DFE. Generally, the threshold settings of the one or more decision latches 650-D are adapted to maintain the decision latches 650-D in the middle of the DFE data eye. One possible implementation for the decision latches 650-D is discussed further below in conjunction with FIG. 7, where the decision latches 650-D is replaced by two latches. The threshold settings of the roaming latches 640-R1 and 640-R2 are adjusted to sample the data eye up and down in the voltage domain, to find the top and bottom edges of the data eye, in the manner discussed below. For example, one roaming latch 640-R1 and 640-R2 can sample data eye from the minimum possible value to an approximate middle region, and the second roaming latch 640-R1 and 640-R2 can sample data eye from the approximate middle region to a maximum possible value. In a further variation a single roaming latch 640-R (not shown) can sample the data eye from a minimum possible value to a maximum possible value.

The present invention uses the Single-Sided DFE Placement Techniques to qualify the data in the current eye based on the previous eye, and to disqualify any local minima. To determine the DFE eye transitioning from a previously detected value of one to a current value of one or zero ($1 \rightarrow x$), the upper DFE data eye is employed using the pre-qualifier value and a mask control signal, based on the value of the previous eye. To determine the DFE eye transitioning from a previously detected value of zero to a current value of one or zero ($0 \rightarrow x$), the lower DFE eye settings are employed.

The outputs of the exemplary roaming latches 640-R1 and 640-R2 and data sampling latch(es) 640-D are applied to a pair of exclusive or (XOR) gates 660-U, 660-L. When the roaming latches 640-R1 and 640-R2 and the data sampling latch(es) 650-D are within the DFE eye, also known as the global minimum region, they produce the same sample polarity. Thus, the output of the XOR gates 660 are binary zero, in a similar manner to the constant zero count mentioned above because the XOR gates 660 produce 0 at the counter input.

As the roaming latches 640-R1 and 640-R2 move out of the global minimum region, the sample polarity between the roaming latches 640-R1 and 640-R2 and the decision latches 650-D begin to disagree. Thus, the XOR gates 660 produce binary values of one (1). The output of the XOR gates 660 are accumulated in a statistics hit counter 685 based on the pre-qualifier, PQ, value. Thus, when the pre-qualifier value indicates that the prior state is a 1, only sample values associated with 1→x transitions are considered by the hit counter 685. Likewise, when the pre-qualifier value indicates that the prior state is a 0, only sample values associated with 0→x transitions are considered by the hit counter 685. This filtering of the samples is achieved by the exemplary logic circuit shown in FIG. 6.

The output of the XOR gates 660-U, 660-L are each applied to a corresponding pair of AND gates 665-U1, 665-U2 and 665-L1, 665-L2, respectively In addition, for each of the two pairs of AND gates 665-U and 665-L, one AND gate receives the pre-qualifier, PQ, value, and the other AND gate receives an inverted version of the pre-qualifier, PQ, value. In this manner, the AND gates 665 allow the sample values for the single-sided eyes pre-qualifier is equal to 1 or 0) to be discriminated. For example, when the upper eye is active, and the data makes transitions from position 610 (1→x transitions), the output 645-U1 of the AND gate 665-U1 will be forced to zero (due to the AND operation with a binary value of 0) and the AND gate 665-U2 will allow the XOR value to reach the multiplexer 670-U. The multiplexer 670-U is controlled by a pre-qualifier select signal.

The outputs 645-U1, 645-U2 and 645-L1, 645-L2 of the AND gates 665-U1, 665-U2 and 665-L1, 665-L2 are applied to a corresponding multiplexer 670-L, 670-U that is also controlled by the pre-qualifier select signal. In this manner, if the pre-qualifier, PQ, value is a 1, only the upper DFE eye (including traces $635_{11}$ and $635_{10}$) is drawn and any 0→x transitions (including traces $635_{01}$ and $635_{00}$) are deleted. Likewise, it the pre-qualifier, PQ, value is a 0, only the lower DFE eye (including traces $635_{01}$ and $635_{00}$) is drawn and any 1→x transitions (including traces $635_{11}$ and $635_{10}$) are deleted. The multiplexer 680 is controlled by a R1/R2 latch control selection signal that selects the output of the upper or lower roaming latches 640-R1 and 640-R2 based on the portion of the sampling interval.

The statistics hit counter 685 counts the output of the XOR gates 660 as controlled by the pre-qualifier, PQ, value in the manner discussed above. Since the XOR gates 660 compare the values of the decision and roaming latches, the output is said to be differential. In this manner, the constant region in the histogram occurs at a value of zero, by design. Thus, outside of the global minimum region, there exists a narrow region over which the statistic hit counter value is constant, but non zero. This allows any invalid local minima to be filtered out merely because the hit count value was non zero.

Among other benefits, this technique is immune to data pattern history. The global minimum will be zero and the local minimum will be non zero. The value of the local minimum count may vary based on the data pattern distribution.

The hit counter 685 can be programmed to evaluate one or both XOR 660 results based on the presence of noise. For example, if the Nyquist attenuation is severe, and inhibits a zero crossing of a Nyquist pattern, the XOR between the decision latch 650-D and the roaming latch 640-R1 may be non-zero. One thus may set a non-zero hit count threshold to detect the global minimum. In other words, anything below the non-zero hit count threshold is part of the eye opening. In a moderate case, the Nyquist pattern may go below the zero crossing and the bottom of the eye can be calculated using the XOR between the decision latch 650-D and the roaming latch 640-R2. The processing of 0->X transitions would be handled in a similar manner, as apparent to a person of ordinary skill.

Figure 7:
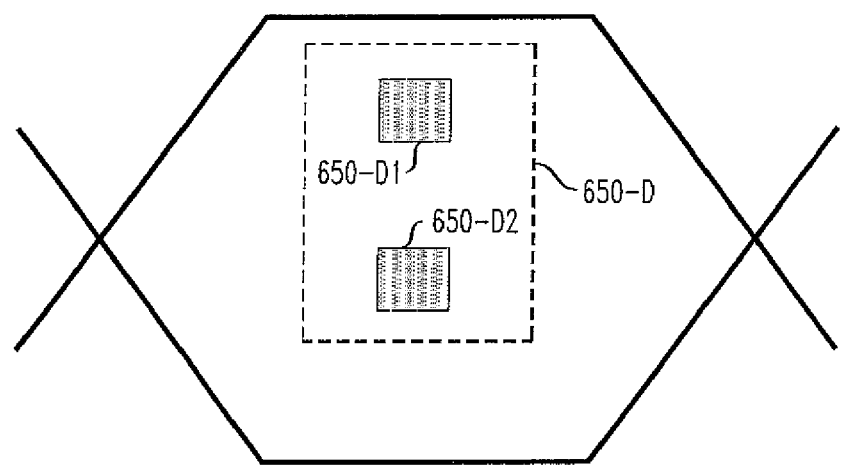
FIG. 7 illustrates an exemplary implementation of a decision latch of FIG. 6 using two DFE decision latches that produce data decisions that are used as a pre-qualifier for a previous eye and to compare values with roaming decisions for a current eye.

FIG. 7 illustrates an exemplary implementation for the decision latches 650-D of FIG. 6. As shown in FIG. 7, the decision latches 650-D may be implemented as an upper DFE latch 650-D1 and a lower DFE latch 650-D2. Generally, the upper DFE latch 650-D1 can be adaptively positioned in an approximate middle of the upper DFE eye, and the lower DFE latch 650-D2 can be adaptively positioned in an approximate middle of the lower DFE eye. In this manner, the upper DFE latch 650-D1 is used to make data detection decisions for 1→x data transitions by placing the upper DFE latch 650-D1 in the approximate middle of the upper DFE eye. Likewise, the lower DFE latch 650-D2 is used to make data detection decisions for 0→x data transitions by placing the lower DFE latch 650-D2 in the approximate middle of the lower DFE eye. Generally, for ease of illustration, the two DFE latches 650-D1 and 650-D2 are replaced with one equivalent data decision latch 650-D, for example, as shown in FIG. 6.

Figure 8:
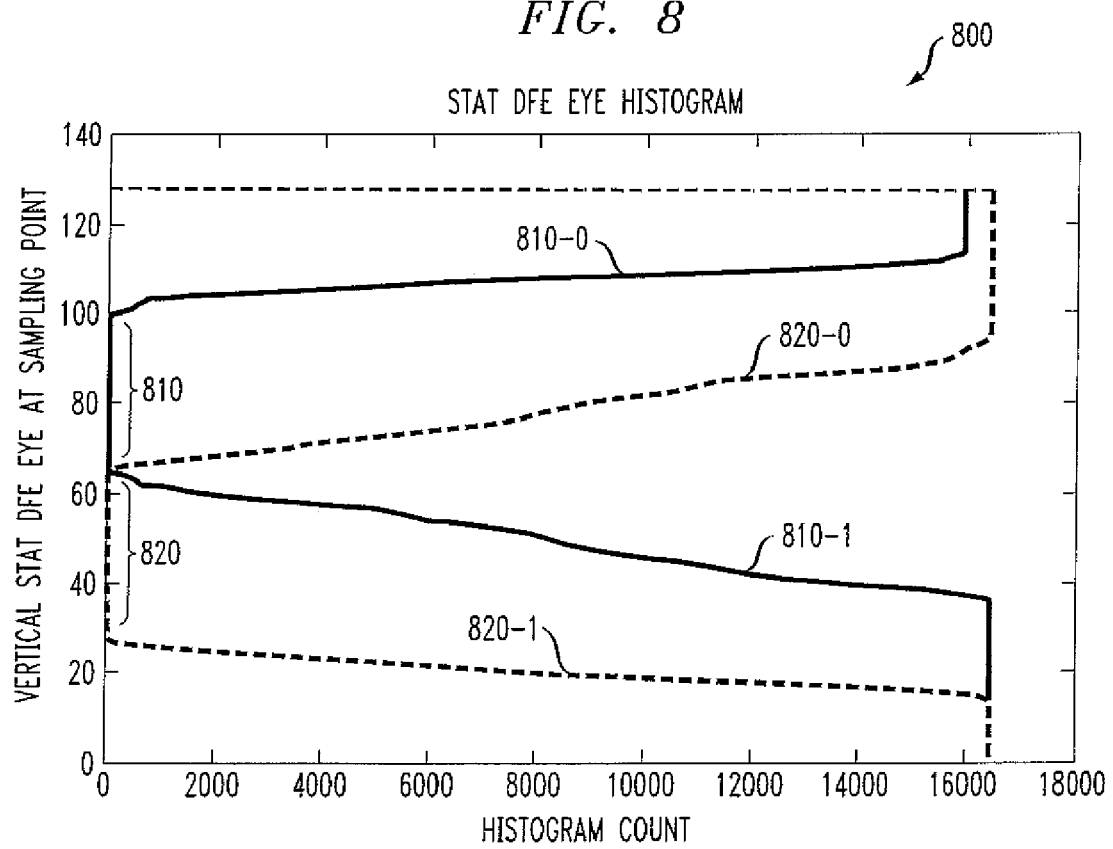
FIG. 8 illustrates the statistics generated by the hit counter of FIG. 6.

FIG. 8 illustrates the statistics generated by the hit counter 685. As indicated above, the output of the XOR gates 660 will be binary zero when the roaming latches 640-R1 and 640-R2 and the data sampling latch(es) 650-D are within the DFE eye (i.e., the global minimum region), as shown by regions 810 and 820 for the upper and lower eyes, respectively. As the roaming latches 640-R1 and 640-R2 move out of the global minimum region, the sample polarity between the roaming latches 640-R1 and 640-R2 and the decision latches 650-D begin to disagree. Thus, the XOR gates 660 produce binary values of one (1) and the hit counter produces a non-zero histogram 810-0, 810-1, 820-0 and 820-1.

The regions 810 and 820 of zero count are processed to establish the height of each data eye and position the latches.

FIG. 9 provides exemplary pseudo code for an illustrative vertical eye search algorithm 900 incorporating features of the present invention. The illustrative vertical eye search algorithm 900 is employed during a training mode and during steady state to determine the position of the latches that used by the Spatial DFE in the normal operating (steady state) mode. As shown in FIG. 9, the exemplary vertical eye search algorithm 900 contains a first alignment section 910 where the latches 640, 650 are aligned in time to the center of the data eye. A first measurement section 920 measures the upper DFE data eye and a second measurement section 930 measures the lower DFE data eye.

An analysis section 940 analyzes the hit count data in the histogram to identify the data eye openings 810, 820 at zero hit counts for the upper and lower DFE data eyes, respectively; identify the minimum and maximum thresholds at zero or pre-defined hit count associated with each data eye opening 810, 820; and establish the latch position for the upper and lower DFE data eyes as the middle of each data eye opening 810, 820. In this manner, the center of the data eye is iteratively recalculated, and the DFE latches are repositioned. It is noted that the data eye openings 810, 820 at zero hit counts may overlap with one another or they may be totally non-overlapping based on intersymbol interference severity.

A plurality of identical die are typically formed in a repeated pattern on a surface of the wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits.

It is to be understood that the embodiments and variations shown and described herein are merely illustrative of the principles of this invention and that various modifications may be implemented by those skilled in the art without departing from the scope and spirit of the invention.

We claim:

1. A method for determining a threshold position of one or more DFE latches employed by a decision-feedback equalizer, comprising:
   obtaining a plurality of samples of a single-sided data eye using at least one decision latch and at least one roaming latch;
   comparing said samples obtained by said at least one decision latch and at least one roaming latch to identify an upper and lower voltage boundary of said single-sided data eye; and
   determining a threshold position of said one or more DFE latches based on said upper and lower voltage boundaries.

2. The method of claim 1, wherein said at least one decision latch is adaptively positioned approximately in a center of a single-sided data eye.

3. The method of claim 2, wherein a first decision latch is adaptively positioned approximately in a center of an upper single-sided data eye and a second decision latch is adaptively positioned approximately in a center of a lower single-sided data eye.

4. The method of claim 1, wherein said at least one roaming latch samples said single-sided data eye for a plurality of voltage settings.

5. The method of claim 4, wherein at least two of said roaming latches sample a portion of said single-sided data eye for a plurality of voltage settings.

6. The method of claim 1, wherein said DFE latch is placed approximately in the middle of said single-sided data eye.

7. The method of claim 1, wherein said DFE latch is placed at an offset position from the middle of said single-sided data eye based on known signal statistical information.

8. The method of claim 1, wherein said DFE latch is positioned for a first single-sided data eye and wherein said method further comprises the step of positioning a DFE latch for a second single-sided data eye based on a symmetry with said first single-sided data eye.

9. The method of claim 1, wherein said single-sided data eye only contains transitions from a first binary value to a binary value of 0 or 1.

10. The method of claim 1, wherein said comparing step further comprises the step of obtaining an exclusive or (XOR) of said samples obtained by said at least one decision latch and at least one roaming latch.

11. The method of claim 1, further comprising the step of filtering said compared samples based on a pre-qualifier signal indicating a value of a previous state.

12. The method of claim 1, wherein said comparing step positions an opening for said single-sided data eye at a zero hit count.

13. The method of claim 1, wherein said comparing step further comprises the step of generating a histogram based on a hit count.

14. A latch positioning system for determining a threshold position of one or more DFE latches employed by a decision-feedback equalizer, comprising:
   at least one decision latch and at least one roaming latch for obtaining a plurality of samples of a single-sided data eye;
   a logic circuit for comparing said samples obtained by said at least one decision latch and at least one roaming latch to identify an upper and lower voltage boundary of said single-sided data eye; and
   a hit counter for determining a threshold position of said one or more DFE latches based on said upper and lower voltage boundaries.

15. The latch positioning system of claim 14, wherein said at least one decision latch is adaptively positioned approximately in a center of a single-sided data eye.

16. The latch positioning system of claim 15, wherein a first decision latch is adaptively positioned approximately in a center of an upper single-sided data eye and a second decision latch is adaptively positioned approximately in a center of a lower single-sided data eye.

17. The latch positioning system of claim 14, wherein said at least one roaming latch samples said single-sided data eye for a plurality of voltage settings.

18. The latch positioning system of claim 17, wherein at least two of said roaming latches sample a portion of said single-sided data eye for a plurality of voltage settings.

19. The latch positioning system of claim 14, wherein said DFE latch is placed approximately in the middle of said single-sided data eye.

20. The latch positioning system of claim 14, wherein said DFE latch is positioned for a first single-sided data eye and wherein said latch positioning system positions a DFE latch for a second single-sided data eye based on a symmetry with said first single-sided data eye.

21. The latch positioning system of claim 14, wherein said logic circuit is an exclusive or (XOR) gate.

22. The latch positioning system of claim 14, further comprising a pre-qualifier logic circuit for filtering said compared samples based on a pre-qualifier signal indicating a value of a previous state.

23. The latch positioning system of claim 14, wherein said logic circuit positions an opening for said single-sided data eye at a zero hit count.

24. A communications receiver for receiving a received signal, comprising:

a latch positioning system for determining a threshold position of one or mole DFE latches employed by a decision-feedback equalizer, comprising:

at least one decision latch and at least one roaming latch for obtaining a plurality of samples of a single-sided data eye;

a logic circuit for comparing said samples obtained by said at least one decision latch and at least one roaming latch to identify an upper and lower voltage boundary of said single-sided data eye; and a hit counter for determining a threshold position of said one or more DFE latches based on said upper and lower voltage boundaries.

* * * * *

UNITED STATES PATENT AND TRADEMARK OFFICE
CERTIFICATE OF CORRECTION

| | | |
|---|---|---|
| PATENT NO. | : 7,720,142 B2 | Page 1 of 1 |
| APPLICATION NO. | : 11/686148 | |
| DATED | : May 18, 2010 | |
| INVENTOR(S) | : Mohammed S. Mobin | |

It is certified that error appears in the above-identified patent and that said Letters Patent is hereby corrected as shown below:

In claim 24, column 11, line 4, "mole" should be replace by -- more --.

Signed and Sealed this
Twenty-fifth Day of December, 2012

David J. Kappos
*Director of the United States Patent and Trademark Office*